(12) United States Patent  
Yamagami et al.

(10) Patent No.: US 10,811,006 B2  
(45) Date of Patent: Oct. 20, 2020

(54) INFORMATION PROCESSING METHOD, INFORMATION PROCESSING APPARATUS, AND NON-TRANSITORY RECORDING MEDIUM

(71) Applicant: Panasonic Intellectual Property Management Co., Ltd., Osaka (JP)

(72) Inventors: Katsuyoshi Yamagami, Osaka (JP); Mitsuru Endo, Tokyo (JP); Takashi Ushio, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 55 days.

(21) Appl. No.: 15/821,747

(22) Filed: Nov. 22, 2017

(65) Prior Publication Data

US 2018/0158459 A1 Jun. 7, 2018

(30) Foreign Application Priority Data

Dec. 6, 2016 (JP) .................................. 2016-236562  
Jul. 13, 2017 (JP) .................................. 2017-137056

(51) Int. Cl.  
*G10L 15/22* (2006.01)  
*G06F 16/33* (2019.01)  
(Continued)

(52) U.S. Cl.  
CPC ........ *G10L 15/22* (2013.01); *G06F 16/24578* (2019.01); *G06F 16/3344* (2019.01); *G06F 40/30* (2020.01); *G10L 15/26* (2013.01)

(58) Field of Classification Search  
CPC ......... G10L 15/22; G10L 15/08; G10L 15/18; G10L 15/1815; G10L 15/1822;  
(Continued)

(56) References Cited

U.S. PATENT DOCUMENTS 5,899,972 A * 5/1999 Miyazawa .............. G10L 15/22  
704/249  
10,318,531 B2 * 6/2019 El Kaissi ............ G06F 16/9535  
(Continued)

OTHER PUBLICATIONS

Verena Rieser et al., "Reinforcement Learning for Adaptive Dialogue Systems", Springer Science & Business Media, Nov. 23, 2011, Chapter 4, pp. 53-70.  
(Continued)

*Primary Examiner* — Qi Han  
(74) *Attorney, Agent, or Firm* — Greenblum & Bernstein, P.L.C.

(57) ABSTRACT

An information processing method for information stored in a storage includes: holding a dialog history of a dialog including a question to a user and a reply from the user to the question, determining whether a manner in which a third reply indicating neither a first reply nor a second reply appears in a reply history of the reply included in the held dialog history satisfies a predetermined condition, the first reply indicating an affirmative in response to the question, the second reply indicating a negative in response to the question; and performing presentation regarding the information stored in the storage if the manner is determined to satisfy the predetermined condition.

14 Claims, 12 Drawing Sheets

(51) Int. Cl.
*G06F 16/2457* (2019.01)
*G06F 40/30* (2020.01)
*G10L 15/26* (2006.01)

(58) Field of Classification Search
CPC ..... G10L 15/183; G10L 15/197; G10L 15/20; G10L 15/26; G10L 15/28
USPC ...... 704/257, 231, 235, 243, 245, 251, 9, 10
See application file for complete search history.

(56) References Cited

U.S. PATENT DOCUMENTS

2008/0281726 A1* 11/2008 Gupta ................ G06Q 30/0601
705/26.1
2012/0246575 A1* 9/2012 Baldwin ................ G06Q 10/10
715/751
2013/0275164 A1 10/2013 Gruber et al.
2014/0231502 A1* 8/2014 Marsico ................ G06F 16/955
235/375
2018/0039633 A1* 2/2018 Miyoshi .............. G10L 15/1822

OTHER PUBLICATIONS

The Extended European Search Report dated May 4, 2018 for European Patent Application No. 17204036.2.
Jennifer Chu-Carroll: "MIMIC : an adaptive mixed initiative spoken dialogue system for information queries", Proceedings of the Sixth Conference on Applied Natural Language Processing (2000), pp. 97-104, XP055469607.
Joyce Chai et al: "Natural Language Assistant: a dialog system for online product recommendation. (Articles)", AI Magazine, Jun. 22, 2002 (Jun. 22, 2002), pp. 63-71, XP055469616, La Canada Retrieved from the Internet: URL: http://www.cse.msu.edu/~jchai/Papers/IAAI02.pdf [retrieved on Apr. 23, 2018].

* cited by examiner

FIG. 3

| UTTERANCE TEXT | SEMANTIC INFORMATION |
|---|---|
| I AGREE. | YES |
| YES | YES |
| ... | ... |
| I DON'T AGREE. | NO |
| NO | NO |
| ... | ... |
| IT'S UP TO YOU. | NOT_CARE |
| I HAVE NO PREFERENCE. | NOT_CARE |
| ... | ... |
| I PREFER No. 1. | CHOOSE_01 |
| I CHOOSE No. 1. | CHOOSE_01 |
| ... | ... |

FIG. 4

| ID | UTTERER | SEMANTIC INFORMATION/REPLY CONTENT |
|---|---|---|
| 1 | System | Q, WHAT RECIPE? |
| 2 | User | NOT_CARE |
| 3 | System | Q, GENRE (CHINESE CUISINE) |
| 4 | User | YES |
| 5 | System | Q, CATEGORY (SALAD) |
| 6 | User | NOT_CARE |
| 7 | System | Q, INGREDIENT (PORK) |
| 8 | User | NOT_CARE |
| .. | ... | ... |

FIG. 5

| NARROW-DOWN KEY | NARROWING-DOWN CONDITION |
|---|---|
| GENRE (CHINESE CUISINE) | YES |
| CATEGORY (SALAD) | NOT_CARE |
| INGREDIENT (PORK) | NOT_CARE |
| RECIPE (FRYING) | NOT_CARE |
| ... | ... |

FIG. 6

| CONTENT ID | CONTENT NAME | NARROW-DOWN KEY ||||||||||
| --- | --- | --- | --- | --- | --- | --- | --- | --- | --- | --- | --- |
| | | TEMPERATURE (WARM) | GENRE (CHINESE CUISINE) | GENRE (JAPANESE CUISINE) | CATEGORY (RICE) | INGREDIENT (PORK) | INGREDIENT (BEEF) | INGREDIENT (EGG) | RECIPE (FRYING) | RECIPE (DEEP FLYING) | RECIPE (STEWING) | RECIPE (ROAST) |
| ⋮ | ⋮ | ⋮ | ⋮ | ⋮ | ⋮ | ⋮ | ⋮ | ⋮ | ⋮ | ⋮ | ⋮ | ⋮ |
| 101 | SWEET-AND-SOUR PORK | YES | YES | NO | NO | YES | NO | NO | NO | YES | YES | NO |
| ⋮ | ⋮ | ⋮ | ⋮ | ⋮ | ⋮ | ⋮ | ⋮ | ⋮ | ⋮ | ⋮ | ⋮ | ⋮ |
| 109 | CHOP SUEY | YES | YES | NO | NO | YES | NO | YES | YES | NO | NO | NO |
| ⋮ | ⋮ | ⋮ | ⋮ | ⋮ | ⋮ | ⋮ | ⋮ | ⋮ | ⋮ | ⋮ | ⋮ | ⋮ |
| 121 | TIANJIN CRAB OMELET ON RICE | YES | YES | NO | YES | NO | NO | YES | NO | NO | NO | YES |
| ⋮ | ⋮ | ⋮ | ⋮ | ⋮ | ⋮ | ⋮ | ⋮ | ⋮ | ⋮ | ⋮ | ⋮ | ⋮ |
| 130 | BOILED MEAT AND POTATOES | YES | NO | YES | NO | NO | YES | NO | NO | NO | YES | NO |
| ⋮ | ⋮ | ⋮ | ⋮ | ⋮ | ⋮ | ⋮ | ⋮ | ⋮ | ⋮ | ⋮ | ⋮ | ⋮ |

FIG. 11

| CONTENT ID | CONTENT NAME | NARROW-DOWN KEY ||||||||| 
| | | GENRE (LITERARY WORK) | GENRE (NONFICTION) | GENRE (PRACTICAL GUIDE) | GENRE (LIFE) | CATEGORY (SCIENCE FICTION) | CATEGORY (SOCIAL NOVEL) | CATEGORY (HISTORICAL NOVEL) | CATEGORY (MANAGEMENT) | CATEGORY (INVESTMENT) |
| --- | --- | --- | --- | --- | --- | --- | --- | --- | --- | --- |
| ⋮ | ⋮ | ⋮ | ⋮ | ⋮ | ⋮ | ⋮ | ⋮ | ⋮ | ⋮ | ⋮ |
| 101 | SHINNICHI HOSHI | YES | NO | NO | NO | YES | NO | NO | NO | NO |
| ⋮ | ⋮ | ⋮ | ⋮ | ⋮ | ⋮ | ⋮ | ⋮ | ⋮ | ⋮ | ⋮ |
| 109 | RYO TAKASUGI | YES | NO | NO | NO | NO | YES | NO | NO | NO |
| ⋮ | ⋮ | ⋮ | ⋮ | ⋮ | ⋮ | ⋮ | ⋮ | ⋮ | ⋮ | ⋮ |
| 121 | RYOTARO SHIBA | YES | NO | NO | NO | NO | NO | YES | NO | NO |
| ⋮ | ⋮ | ⋮ | ⋮ | ⋮ | ⋮ | ⋮ | ⋮ | ⋮ | ⋮ | ⋮ |
| 130 | KONOSUKE MATSUSHITA | NO | NO | YES | NO | NO | NO | NO | YES | NO |
| ⋮ | ⋮ | ⋮ | ⋮ | ⋮ | ⋮ | ⋮ | ⋮ | ⋮ | ⋮ | ⋮ |

INFORMATION PROCESSING METHOD, INFORMATION PROCESSING APPARATUS, AND NON-TRANSITORY RECORDING MEDIUM

BACKGROUND

Technical Field

The present disclosure relates to an information processing method, an information processing apparatus, and a non-transitory recording medium.

Dialog systems that use dialogs for searching for or providing content (such as music or product information) desired by a user have been proposed. A dialog system as described above acquires information from the user to narrow down pieces of content step by step by using dialogs, narrows down the content to content candidates meeting the user's desire, and displays a candidate list at a specific timing.

To determine the timing in the dialogs as described above at which the candidate list resulting from the narrowing down operation using the dialogs is presented, a reinforcement-learning-based method for controlling timing of presenting a candidate list has been proposed (see Verena Rieser, Oliver Lemon, "Reinforcement Learning for Adaptive Dialogue Systems", Springer Science & Business Media, Nov. 23, 2011).

In the method proposed in "Reinforcement Learning for Adaptive Dialogue Systems", information regarding the characteristic of a user is given as an element of a reward function of reinforcement learning. The characteristic of the user is whether they are tolerant to the length of time in which dialogs are displayed a plurality of times, in other words, whether they would like the candidate list to be presented at a relatively early stage. Control of presenting the candidate list is based on the information regarding the characteristic. Accordingly, to appropriately control the candidate-list presentation timing, information regarding the characteristic of the user needs to be acquired in advance. If the information is not acquired in advance, the timing control is not appropriately performed.

SUMMARY

In one general aspect, the techniques disclosed here feature an information processing method for pieces of information stored in a storage. The method includes: holding a dialog history of a dialog including a question to a user and a reply from the user to the question; determining whether a manner in which at least one third reply indicating neither a first reply nor a second reply appears in a reply history of the reply included in the held dialog history satisfies a predetermined condition, the first reply indicating an affirmative in response to the question, the second reply indicating a negative in response to the question; and performing presentation regarding the pieces of information stored in the storage if the manner is determined to satisfy the predetermined condition.

According to the information processing method of the present disclosure, the timing of presenting the candidate list can be appropriately controlled.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is an explanatory table illustrating an example of conversion from an utterance text to semantic information performed by a language understander according to the embodiment;

FIG. 4 is an explanatory table illustrating an example of a dialog history held by a dialog history holder according to the embodiment;

FIG. 5 is an explanatory table illustrating an example of narrowing-down information held by a narrowing-down information holder according to the embodiment;

FIG. 6 is an explanatory content table illustrating an example of pieces of content stored in a content database according to the embodiment;

FIG. 11 is an explanatory table illustrating a content table of the dialog system according to the embodiment in a different application example;

DETAILED DESCRIPTION

Figure 1:
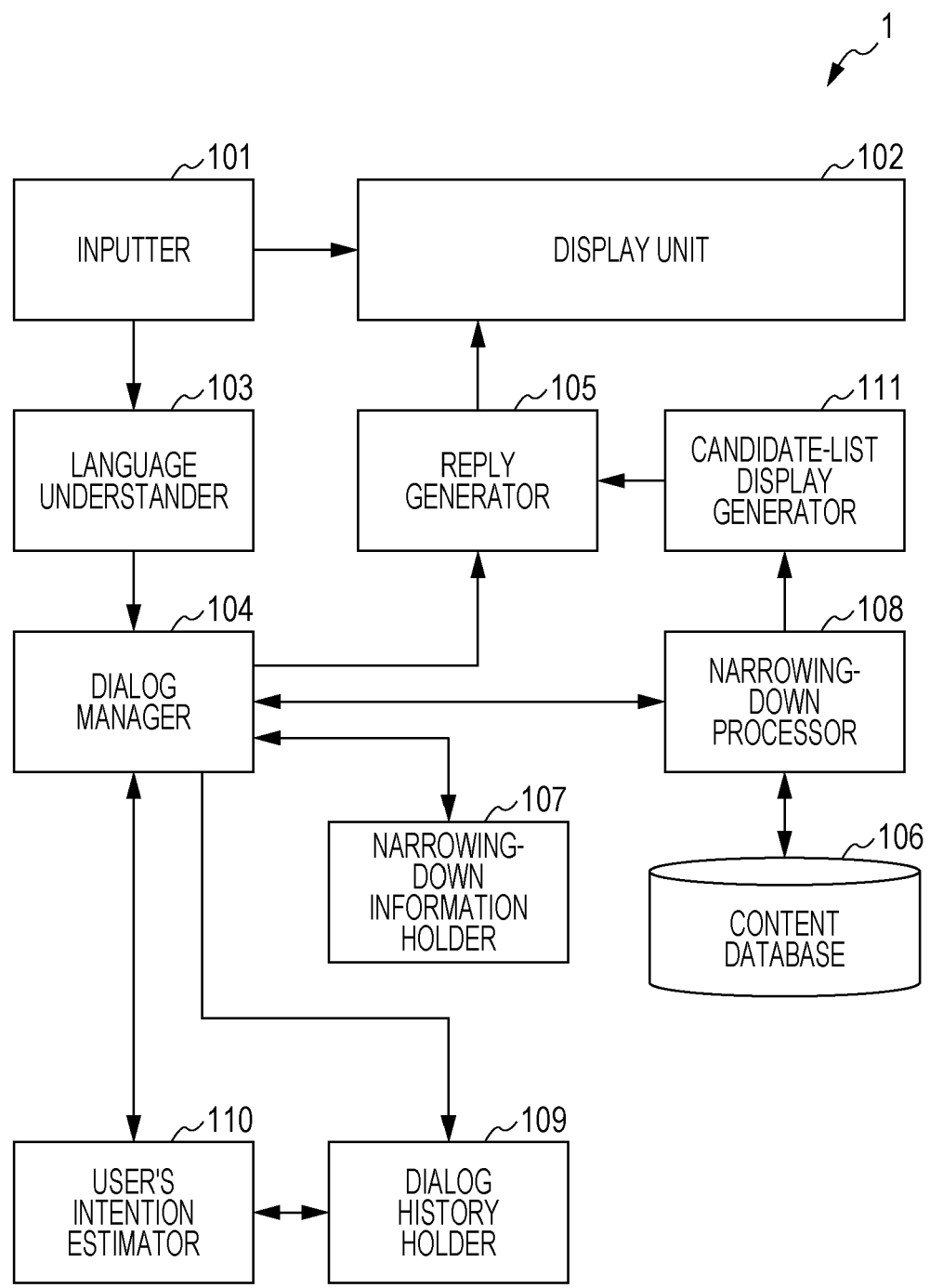
FIG. 1 is a block diagram illustrating the configuration of a dialog system according to an embodiment.

Underlying Knowledge Forming Basis of the Present Disclosure

Dialog systems that use dialogs for searching for or providing content (such as music or product information) desired by a user have been proposed. A dialog system as described above generally contains a large number of pieces of content to be searched for or provided. The dialog system acquires pieces of information from the user to narrow down the pieces of content based on dialogs step by step and thereby narrows down the content to content candidates meeting the user's desire. For example, if the number of narrowed-down candidates falls below a predetermined number, the candidates are presented to the user as a candidate list on the screen. The user checks the presented candidates and can thereby select a desired candidate.

Note that a timing at which the number of candidates falls below a predetermined number is not necessarily considered an appropriate criterion for determining candidate presenting timing. When more dialogs than expected by the user are displayed before candidates are presented, this leads to high dissatisfaction with slow presentation of a search result or suggestion. In contrast, when fewer dialogs than expected by the user are displayed before candidates are presented, this leads to high dissatisfaction of insufficient narrowing-down without a large number of conditions being input. As described above, the timing (how early or late) expected by the user for browsing a narrowed-down candidate list in the course of displaying the dialogs is considered to be user-dependent.

In the method for controlling narrowed-down result presentation using the above-described related art, a reward function calculated from three parameters is used. The three parameters are rate of speech recognition errors due to noise (that is, a probability that the content of an actual utterance of a user does not match the content of an utterance recognized by a dialog system), the size of a display for the narrowed-down result, and the tolerance of the user to the number of dialogs displayed. In addition, the control method repeats determination of whether to ask a question or display a list, the question being asked so that the reinforcement learning can result in the highest reward calculated by the reward function in the dialogs. Specifically, in the control method, control is not based on a threshold that is a predetermined number of candidates for determining whether to present a result. Instead, a dialog state set based on the three parameters is comprehensively evaluated as the reward function, and thereby the timing for displaying the narrowed-down result list is dynamically determined.

However, the timing in the related art is controlled on the assumption that the parameter for the user's tolerance to the number of dialogs displayed is known. Accordingly, when the parameter is unknown, the timing is not appropriately controlled. In other words, in the related art, the parameter such as the users tolerance needs to be acquired in advance to appropriately control the candidate-list presentation timing.

One non-limiting and exemplary embodiment provides an information processing method for controlling candidate-list presentation timing more appropriately even if information regarding the characteristic of a user is not acquired.

According to an aspect of the present disclosure, an information processing method for pieces of information stored in a storage is provided. The method includes: holding a dialog history of a dialog including a question to a user and a reply from the user to the question; determining whether a manner in which at least one third reply indicating neither a first reply nor a second reply appears in a reply history of the reply included in the held dialog history satisfies a predetermined condition, the first reply indicating an affirmative in response to the question, the second reply indicating a negative in response to the question; and performing presentation regarding the pieces of information stored in the storage if the manner is determined to satisfy the predetermined condition.

According to the aspect, the information processing method controls timing of presenting a candidate list in accordance with the content of user's utterances in the dialogs with the user. The third reply that is neither an affirmative reply nor a negative reply is also considered to be an expression of the user's intention not to provide an explicit narrowing-down condition. Accordingly, the manner in which the third reply appears may be a criterion for estimating whether the user would like to browse the content candidate list at that time. Even though the information indicating whether the user's intention to browse the list of narrowed-down content candidates early (that is, the tolerance described above) is not acquired in advance, the timing of presenting the list of narrowed-down content candidates can thereby be controlled in such a manner that the user's intention is estimated in accordance with the content of the user's utterances.

The information processing method is applicable to an application for a dialog system that narrows down a large number of pieces of content by using dialogs and that presents pieces of content satisfying the user's intention. In particular, the information processing method is applicable to an application that presents, in a case where the user does not utter information for narrowing down the pieces of content very clearly, candidates at an appropriate timing by using the dialog system and that causes the user to make a choice.

For example, the predetermined condition is a condition in which the third reply appears in succession a predetermined number of times in the reply history.

According to the aspect, with the information processing method, the use of the condition in which the third reply appears in succession the predetermined number of times enables the information processing method to be implemented more specifically. The candidate-list presentation timing can be controlled more appropriately.

For example, the predetermined condition is a condition in which the third reply appears a predetermined total number of times in the reply history.

According to the aspect, with the information processing method, the use of the condition in which the third reply appears the predetermined total number of times enables the information processing method to be implemented more specifically. The candidate-list presentation timing can be controlled more appropriately.

For example, in the presentation, at least one of the pieces of information stored in the storage is presented.

According to the aspect, based on the intention estimation, the information processing method can cause the user to browse the list of narrowed-down content candidates. The user's intention is estimated based on the content of the user's utterances as described above, and the timing of presenting the list of narrowed-down content candidates can thereby be controlled.

For example, in the presentation, a question as to whether at least one of the pieces of information stored in the storage is to be presented is presented.

According to the aspect, based on the intention estimation, the information processing method can present a question as to whether the list of narrowed-down content candidates is to be browsed by the user. The timing control based on the intention estimation causes the content candidate list to be presented at a timing different from a timing actually intended by the user in some cases. To address this, the question is used to confirm the user's actual intention, and the content candidate list can thus be prevented from being presented against the user's intention.

For example, in the presentation, if an affirmative reply from the user is acquired in response to the question, the at least one of the pieces of information stored in the storage is presented.

According to the aspect, with the information processing method, the content candidate list can be presented to the user and cause the user to browse the content candidate list after correspondence between the timing of presenting the content candidate list and the timing intended by the user is confirmed.

For example, the information processing method further includes executing a process for narrowing down the pieces of information stored in the storage by using the reply included in the dialog; and performing the presentation regarding the pieces of information stored in the storage after the process is executed.

According to the aspect, with the information processing method, pieces of information stored in the storage can be narrowed down by using the dialog interface, and the narrowed-down pieces of information can be presented to the user. Unlike information search with a search engine or the like, the user can perform information search based on sequential information input using dialogs and receive suggestion from the dialog system.

For example, the information processing method further includes executing a process for narrowing down the pieces of information stored in the storage by using predetermined information if the reply history is determined to include only the at least one third reply; and performing the presentation regarding the pieces of information stored in the storage after the process is executed.

According to the aspect, if there is no narrowing-down condition, the information processing method can avoid displaying a list of all of the pieces of information stored in the storage, that is, the pieces of information having not narrowed down.

For example, the question is a closed question for causing the user to make one of the first reply, the second reply, and the third reply.

According to the aspect, with the information processing method, searches and proposals can be performed more specifically based on dialogs including the closed question that provides options to select one of the options as an answer and the answer to the question.

For example, the storage stores, as the pieces of information, a plurality of pieces of information indicating respective dishes. The dialog includes the question to the user about searching of the dishes and the reply from the user in response to the question.

According to the aspect, with the information processing method, a search or a proposal for a dish can be provided to the user by narrowing down the pieces of information indicating the respective dishes.

For example, the storage stores, as the pieces of information, a plurality of pieces of information indicating respective authors. The dialog includes the question to the user about searching of the authors and the reply from the user in response to the question.

According to the aspect, with the information processing method, a search or a proposal for an author can be provided to the user by narrowing down the pieces of information indicating the respective authors.

According to an aspect of the present disclosure, an information processing method for a dish favored by a user that is performed using a dialog in a chat form via a terminal of the user is provided. The method includes: displaying a first question about a request for the dish, the displaying being performed based on a database in a balloon form on a display included in the terminal, the database including a plurality of dishes and a plurality of pieces of classification information each indicating a corresponding one of classifications of the respective plurality of dishes, each dish being associated with a corresponding one of the pieces of classification information, each piece of classification information including warmness or coldness of a corresponding one of the dishes, a genre of the corresponding dish, a category of the corresponding dish, a recipe of the corresponding dish, and an ingredient used for the corresponding dish, the first question inquiring whether to request a first classification for the dish, the first classification being included in the database; receiving a first answer input via the terminal by the user in response to the first question; if the first answer is determined to include a word that affirms the first classification, displaying a second question as to whether a second classification matching first dishes falling in the first classification is to be requested, the displaying being performed based on the database in the balloon form on the display, the second classification being different from the first classification; receiving a second answer input via the terminal by the user in response to the second question; if the second answer is determined to include neither a word that affirms the second classification nor a word that refuses the second classification, displaying a third question as to whether a third classification matching the first dishes is to be requested, the displaying being performed based on the database in the balloon form on the display, the third classification being different from the first classification and the second classification; receiving a third answer input via the terminal by the user in response to the third question; if the third answer is determined to include a word that affirms the third classification, displaying, in the balloon form, a fourth question as to whether a fourth classification matching a second dish falling in the third classification among the first dishes is to be requested, the fourth classification being different from the first classification, the second classification, and the third classification; if the third answer is determined to include a word that refuses the third classification, displaying, in the balloon form, a fifth question as to whether a fifth classification matching a third dish not falling in the third classification among the first dishes is to be requested, the fifth classification being different from the first classification, the second classification, the third classification, and the fourth classification; if the third answer is determined to include neither the word that affirms the third classification nor the word that refuses the third classification, displaying, in the balloon form on the display, a fifth question as to whether a piece of information indicating one of the first dishes is to be displayed; receiving a fifth answer input via the terminal by the user in response to the fifth question; and if the fifth answer is determined to include a word that affirms displaying of the piece of information indicating the first dish, displaying the piece of information indicating the first dish on the display.

According to the aspect, the same effects as those of the information processing method are exerted.

According to an aspect of the present disclosure, an information processing apparatus for performing information processing on information stored in a storage is provided. The information processing apparatus includes a dialog history holder, a dialog manager, and a presenter. The dialog history holder holds a dialog history of a dialog including a question to a user and a reply from the user to the question. The dialog manager determines whether a manner in which a third reply indicating neither a first reply nor a second reply appears in a reply history of the reply included in the held dialog history satisfies a predetermined condition. The first reply indicates an affirmative in response to the question. The second reply indicates a negative in response to the question. The presenter performs presentation regarding the information stored in the storage if the manner is determined to satisfy the predetermined condition.

According to the aspect, the same effects as those of the information processing method are exerted.

According to an aspect of the present disclosure, a non-transitory recording medium is provided. The non-transitory recording medium stores a program for causing a computer to execute the information processing method according to the above-described aspect of the present disclosure.

According to the aspect, the same effects as those of the information processing method are exerted.

Note that the general or specific aspects may be implemented as a system, an apparatus, an integrated circuit, a computer program, a computer readable recording medium such as a compact disk read-only memory (CD-ROM), or a combination of any of the system, the apparatus, the integrated circuit, the computer program, and the recording medium.

Hereinafter, an embodiment will be specifically described with reference to the drawings.

Note that the embodiment to be described below represents general or specific examples of the present disclosure. Numerical values, shapes, materials, components, arrangement locations and a connection mode of the components, steps, the order of the steps, and the like that are described in the embodiment below are merely examples and do not limit the present disclosure. If a component that is not described in an independent claim corresponding to the highest level description of the present disclosure is described in the following embodiment, the component is described as an optional component.

Embodiment

A dialog system 1 that controls candidate-list presentation timing more appropriately in the embodiment will be described. Note that the dialog system 1 corresponds to an information processing apparatus. The control method performed by the dialog system 1 is also referred to as a method for controlling narrowed-down result presentation or an information processing method.

FIG. 1 is a block diagram illustrating an example configuration of the dialog system 1 according to the embodiment.

As illustrated in FIG. 1, the dialog system 1 according to the embodiment includes an inputter 101, a display unit 102, a language understander 103, a dialog manager 104, a reply generator 105, a content database 106, a narrowing-down information holder 107, a narrowing-down processor 108, a dialog history holder 109, a user's intention estimator 110, and a candidate-list display generator 111.

The dialog system 1 narrows down pieces of content stored in the content database 106 by using dialogs with a user and presents, to the user, pieces of content resulting from the narrowing down operation. Each dialog is a dialog with the user, for example, in a chat form, and the dialog system 1 performs information processing for information desired by the user.

The content database 106 stores therein a plurality of pieces of content to be narrowed down. Examples of content include information indicating a dish (also simply referred to as a "dish"). Although the case where the pieces of content are dishes will be described later, content might include various pieces of information such as information indicating an author and real estate. The content database 106 corresponds to a storage and may be implemented by a storage device, a database management system, or the like.

The content database 106 stores therein pieces of information each indicating a dish. The dialog system 1 provides information indicating a dish desired by the user by using dialogs each including a question to the user about searching for the dish and a reply to the question by the user.

The inputter 101 acquires an utterance given by the user to the dialog system 1 and converts the utterance to an utterance text. The display unit 102 displays the utterance text input by the user via the inputter 101, a reply text from the dialog system 1 to the user, and other pieces of reply information. The inputter 101 may be implemented by a processor, a memory, and other devices. The inputter 101 may include a microphone that picks up an utterance of the user and thereby acquires an audio signal. Alternatively, the inputter 101 does not have to include the microphone and may acquire an audio signal generated after an external microphone picks up an utterance. The inputter 101 acquires an utterance text through a speech recognition process executed on the acquired audio signal. The speech recognition process may use a publicly known technology.

The display unit 102 displays an utterance text, a reply text, and the like. The display unit 102 may be implemented by a processor, a memory, a display (display screen), and other devices. The display unit 102 may also be implemented by an image displayed on a display. Note that the display unit 102 is an example of a presenter. Instead of the display unit 102, the dialog system 1 may include, as another example of the presenter, a voice outputter that outputs voice representing a reply text or the like.

Figure 2:
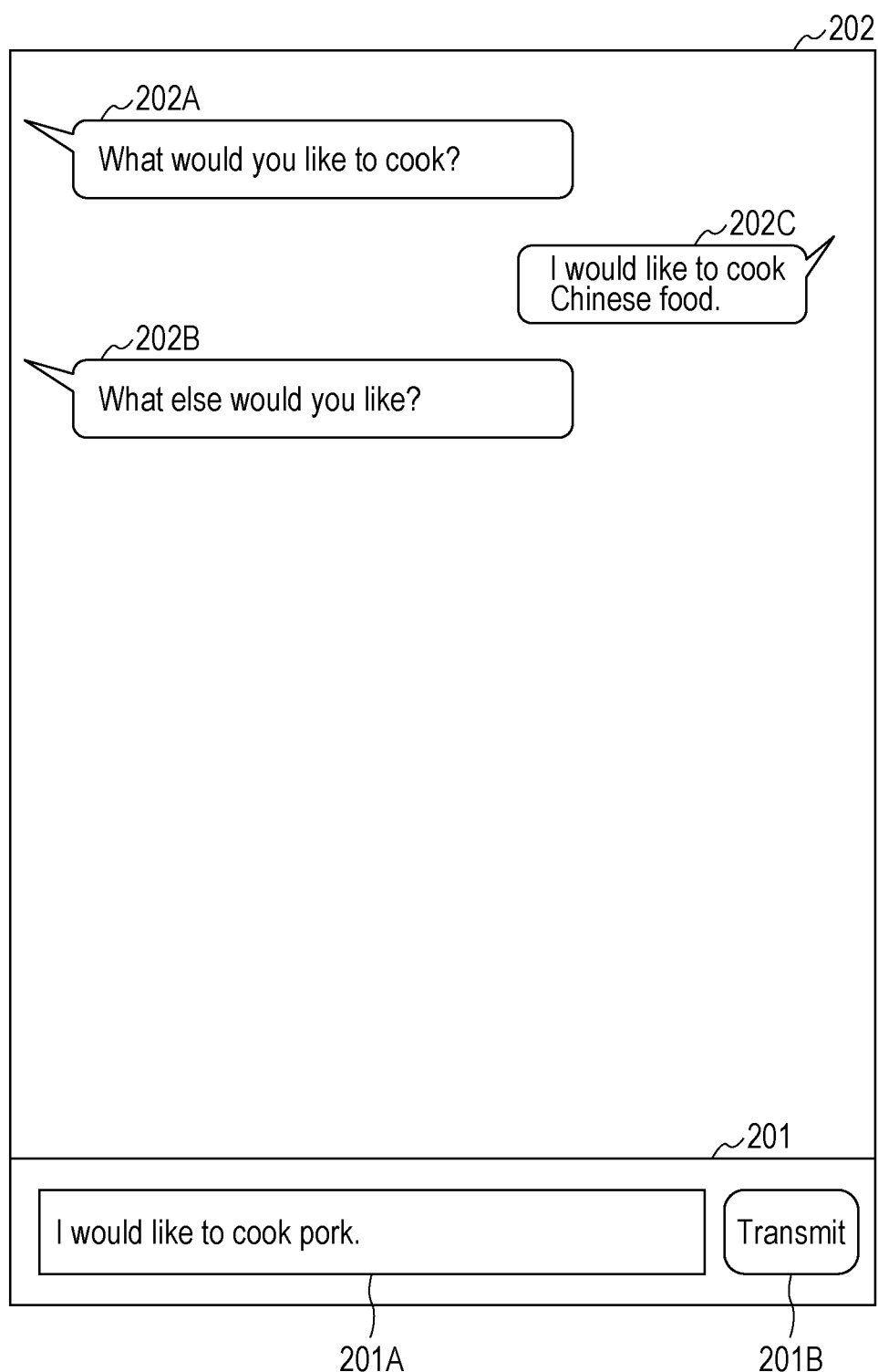
FIG. 2 is an explanatory diagram illustrating an inputter and a display unit according to the embodiment.

FIG. 2 is an explanatory diagram illustrating examples of the inputter 101 and the display unit 102 according to the embodiment. FIG. 2 illustrates an example image of the inputter 101 and the display unit 102 that are each implemented as a graphical user interface (GUI) displayed on the display.

An image 201 illustrated in FIG. 2 corresponds to the inputter 101, and an image 202 illustrated in FIG. 2 corresponds to the display unit 102.

The user operates the image 201 serving as the inputter 101 and inputs an utterance text in an input field 201A. The user operates a transmission button 201B and completes the input of the utterance text. Note that the term "to operate" denotes to perform a general operation on the GUI such as pressing, touching, tapping, or clicking.

The image 202 corresponding to the display unit 102 displays, in a balloon form, an utterance text input by the user and a reply text from the dialog system 1. FIG. 2 illustrates reply texts 202A and 202B from the dialog system 1 and an utterance text 202C input by the user. The reply texts 202A and 202B are displayed on the left side of the image 202 in a time series from the top toward the bottom. The utterance text 202C is displayed on the right side of the image 202 in a time series from the top toward the bottom. When the reply texts 202A and 202B or the utterance text 202C reaches the lower end of the image 202, the image 202 scrolls upwards and a new reply text or a new utterance text is displayed within the image 202.

The language understander 103 performs language analysis on the user's utterance text input via the inputter 101 and converts the utterance text to semantic information. The language understander 103 may be implemented in a publicly known language analysis process executed by a processor, a memory, and other devices.

FIG. 3 is an explanatory table illustrating an example of conversion from an utterance text to semantic information performed by the language understander 103 according to the embodiment.

The language understander 103 converts the expression of an utterance text to semantic information having the same meaning.

For example, the language understander 103 converts, to semantic information indicating "YES", an utterance text indicating an affirmative reply to a question, such as "I agree" or "Yes". The language understander 103 also converts, to semantic information indicating "NO", an utterance text indicating a negative reply to a question, such as "I don't agree" or "No". The language understander 103 also converts an utterance text indicating neither the affirmative reply nor the negative reply, such as "It's up to you" or "I have no preference" to semantic information "NOT_CARE".

To implement the function of the language understander 103, various methods may be employed. Examples of the methods include a rule base method in which a table of expected utterance texts is generated in advance and matching with semantic information is performed and a method in which utterance texts are labeled with semantic information based on machine learning.

The dialog manager 104 receives the semantic information converted by the language understander 103. In accordance with the type of the semantic information, the dialog manager 104 controls content narrowing-down, controls operations of the dialog system 1 with reference to a dialog history, or determines the content of a reply to be made from the dialog system 1. Specifically, the dialog manager 104 determines whether the manner in which a third reply that is neither an affirmative reply nor a negative reply appears in a reply history in the dialog history held by the dialog history holder 109 satisfies a predetermined condition. The dialog manager 104 determines, as the content of a reply (hereinafter, also referred to as reply content in some cases), a closed question that provides options to cause the user to select one of the options as a reply. The dialog manager 104 may be implemented by a processor, a memory, a storage device, and other devices.

The reply generator 105 converts the reply content determined by the dialog manager 104 to a reply text. The reply content determined by the dialog manager 104 has a symbol sequence corresponding to "Q, genre (Chinese cuisine)" or the like. The reply generator 105 converts the reply content to a reply text representing a question sentence "Do you prefer Chinese cuisine?". The reply generator 105 may be implemented by a processor, a memory, and other devices.

After receiving the semantic information regarding the user's utterance text and after determining the content of a reply (corresponding to the semantic information) to be made from the dialog system 1 to the user, the dialog manager 104 stores each of the semantic information and the reply content in the dialog history holder 109. The dialog history holder 109 holds a history of dialogs including a question to the user and a reply to the question from the user. The dialog history holder 109 may be implemented by a storage device.

FIG. 4 is an explanatory table illustrating an example of a dialog history held by the dialog history holder 109 according to the embodiment.

As illustrated in FIG. 4, the dialog history is recorded as a table. Each row represents the user's utterance or a reply from the dialog system 1.

The leftmost column of the dialog history has information indicating identifications (IDs) (or numbers) representing the order of the corresponding utterance or reply in the dialogs. The IDs start with 1. Every time one record is added, the ID number is incremented by 1.

The second leftmost column of the dialog history has information indicating an utterer. In the case of a reply from the dialog system 1 to the user, "System" is recorded. In the case of an utterance from the user to the dialog system 1, "User" is recorded.

The third leftmost column of the dialog history has semantic information indicating an utterance from the user or information indicating the content of a reply from the dialog system 1.

If the content of a reply from the dialog system 1 recorded in the dialog history holder 109 represents a question such as "Q, genre (Chinese cuisine)" and if the user's utterance (answer) in response to the question is one of "YES", "NO", and "NOT_CARE", the dialog manager 104 uses, as a narrow-down key, "genre (Chinese cuisine)" that is the content of a reply preceding the user's utterance. In this case, the dialog manager 104 uses one of "YES", "NO", and "NOT_CARE" as a narrowing-down condition for the narrow-down key. The dialog manager 104 stores a combination of the narrow-down key and the narrowing-down condition as narrowing-down information in the narrowing-down information holder 107. The narrowing-down information holder 107 may be implemented by a storage device.

FIG. 5 is an explanatory table illustrating an example of the narrowing-down information held by the narrowing-down information holder 107 according to the embodiment.

The leftmost column of the narrowing-down information has narrow-down keys, and the second leftmost column has narrowing-down conditions. The dialog manager 104 acquires a plurality of pieces of narrowing-down information through dialogs between utterances from the user and replies from the dialog system 1 and stores the pieces of information in the narrowing-down information holder 107.

The dialog manager 104 instructs the narrowing-down processor 108 to execute a process for narrowing down the pieces of content stored in the content database 106 by using the narrowing-down information stored in the narrowing-down information holder 107.

FIG. 6 is an explanatory content table illustrating an example of the pieces of content stored in the content database 106 according to the embodiment. FIG. 6 illustrates an example content table generated in the case where the pieces of content are dishes. Note that the content database 106 is also simply referred to as a database.

Each row of the content table illustrated in FIG. 6 represents information regarding a piece of content.

The leftmost column of the content table has information indicating content IDs for identifying respective pieces of content. Each content ID is a numerical value such as 101 or 109 but may include alphabetical letters or symbols.

The second leftmost column of the content table has information indicating a content name that is the name of the content. The content name is recorded as a character string such as sweet-and-sour pork or chop suey.

The third leftmost column and succeeding columns of the content table have pieces of narrowing-down information that are each composed of combinations of a narrow-down key and a narrowing-down condition that are each assigned to a corresponding piece of content. The narrowing-down information corresponds to classification information indicating the classification of the piece of content.

For example, in the content table illustrated in FIG. 6, a piece of content with a content ID 101 includes "sweet-and-sour pork" as a content name and "temperature (warm)= YES", "genre (Chinese cuisine)=YES", "genre (Japanese cuisine)=NO", and the like as combinations of a narrow-down key and a narrowing-down condition. Note that FIG. 6 does not illustrate all of the pieces of narrowing-down information, and the pieces of information may further include other types of narrow-down keys and narrowing-down conditions than those illustrated in FIG. 6.

The narrowing-down processor 108 executes the process for narrowing down the pieces of content stored in the content database 106 in accordance with the instruction from the dialog manager 104 and holds narrowed-down results as pieces of candidate content. The narrowing-down processor 108 uses the pieces of narrowing-down information held in the narrowing-down information holder 107 and executes the narrowing-down process in such a manner as to extract pieces of content each satisfying the corresponding piece of narrowing-down information among the pieces of content in the content database 106. The narrowing-down processor 108 may be implemented by a processor, a memory, and other devices.

If the narrowing-down condition "YES" or "NO" is set for the corresponding narrow-down key, the narrowing-down process is executed in such a manner as to extract only pieces of content that satisfy a piece of narrowing-down information that is a combination of the narrow-down key and the narrowing-down condition. If the narrowing-down condition "NOT_CARE" is set for the narrow-down key, extracted pieces of content may satisfy or may not satisfy the combination with the narrow-down key in the narrowing-down process. In this manner, the narrowing-down processor 108 extracts a plurality of pieces of content simultaneously satisfying the piece of narrowing-down information and holds the extracted pieces of content as the pieces of candidate content.

For example, the pieces of content in the content database 106 in FIG. 6 are narrowed down by using the narrowing-down information illustrated in FIG. 5. In this case, pieces of content satisfying search information "genre (Chinese cuisine)=YES" are extracted. The narrowing-down process thus results in pieces of content "sweet-and-sour pork", "chop suet", and "Tianjin crab omlet on rice" respectively having the content IDs 101, 109, and 121 in FIG. 6.

The user's intention estimator 110 estimates the user's intention based on the state of the dialog history sequence. The dialog manager 104 determines the next dialog operation in accordance with the user's intention estimation result obtained by the user's intention estimator 110 based on the state of the dialog history sequence. The user's intention estimator 110 may be implemented by a processor, a memory, and other devices.

If the content of a reply from the dialog system 1 that precedes an utterance from the user is "Q, narrow-down key", and if the semantic information regarding the user's utterance is one of "YES", "NO", and "NOT_CARE", the user's intention estimator 110 estimates that the user intends to perform a "narrowing-down request". In this case, the dialog manager 104 combines the narrow-down key in the reply content with the narrowing-down condition acquired from the semantic information regarding the utterance from the user and adds the combination to the narrowing-down information held in the narrowing-down information holder 107. The dialog manager 104 then instructs the narrowing-down processor 108 to execute the narrowing-down process.

For example, when "ID=4" and "semantic information=YES" in the dialog history holder 109 in FIG. 4 is acquired in response to the reply content having "ID=3" and "Q, genre (Chinese cuisine)", the user's intention estimator 110 estimates that the user intends "to narrow down". The dialog manager 104 instructs the narrowing-down processor 108 to execute the process for narrowing down pieces of content.

In contrast, if the sequence of the dialog history held in the dialog history holder 109 satisfies the predetermined condition, the user's intention estimator 110 estimates that the user intends to perform a "candidate list request". For example, the predetermined condition is a condition in which "NOT_CARE" that is semantic information regarding the user's utterance appears twice in succession in response to the reply content "Q, narrow-down key".

For example, at the time when the semantic information regarding the user's utterance with "ID=8" in the dialog history holder 109 in FIG. 4 is acquired, "NOT_CARE" has appeared twice in succession in the reply history in response to "Q, narrow-down key". More specifically, the utterance with "ID=6" and "NOT_CARE" as the semantic information has appeared in response to the reply content having "ID=5" and "Q, category (salad)", and the utterance with "ID=8" and "NOT_CARE" as the semantic information has appeared in response to the reply content having "ID=7" and "Q, ingredient (pork)". Accordingly, the utterance indicating "NOT_CARE" as the semantic information has appeared twice in succession in the reply history in response to "Q, narrow-down key". Since the predetermined condition is satisfied at this time, the user's intention estimator 110 estimates that the user intends to perform a "candidate list request".

Note that the user's intention estimator 110 herein estimates that the user intends to perform a "candidate list request" by using the condition in which the utterance indicating "NOT_CARE" as the semantic information appears twice in succession in the reply history in response to the reply content "Q, narrow-down key". However, another condition may be used. For example, a condition in which "NOT_CARE" appears at least a predetermined number of times, that is, at least three times in succession in response to "Q, narrow-down key" may be used. A condition in which "NOT_CARE" appears at least a predetermined total number of times, that is, at least twice in total or at least three times in total in response to "Q, narrow-down key" may be used.

As a determination method, a method based on whether a specific pattern of dialog appears, that is, a pattern of combination of a reply and an utterance appears may be used as described above. Alternatively, machine learning may be performed by using, as learning data, data including a history of dialogs between humans and annotated with user's intention estimation results acquired based on the history.

If the user's intention estimator 110 estimates that the user intends to perform a "candidate list request", the dialog manager 104 instructs the candidate-list display generator 111 to generate a list of pieces of candidate content held by the narrowing-down processor 108.

The candidate-list display generator 111 generates a candidate-list text in a format of text information displayable by the display unit 102. The candidate-list text is generated from pieces of candidate content that result from the preceding narrowing-down process and that are held by the narrowing-down processor 108. The generated candidate-list text is added as a part of a reply text to be generated by the reply generator 105 to the reply text and is displayed by the display unit 102 as reply information from the dialog system 1. If the dialog manager 104 determines that the predetermined condition is satisfied as described above, the display unit 102 performs presentation, that is, displays information stored in the content database 106. The above-described examples of the information are at least one of the pieces of information that are narrowed down in the narrowing-down process and that are stored in the content database 106. The candidate-list display generator 111 may be implemented by a processor, a memory, and other devices.

Note that in the presentation performed by the display unit 102, a question to the user as to whether at least one of the pieces of information stored in the content database 106 is to be presented may be presented in advance. Only if an affirmative reply to the question from the user is acquired, at least one of the pieces of information stored in the content database 106 may be presented.

Note that assume a case where the user's intention estimator 110 estimates that the user intends to perform a "candidate list request" and where a narrowing-down condition is not set in the narrowing-down information holder 107, in other words, a case where the user's intention estimator 110 estimates that only at least one third reply is included in the reply history. In this case, the narrowing-down processor 108 may execute the narrowing-down process by using predetermined information, and the candidate-list display generator 111 may then generate a candidate-list text. This is performed to avoid setting all the pieces of content stored in the content database 106 as candidates if there is no narrowing-down condition.

Figure 7:
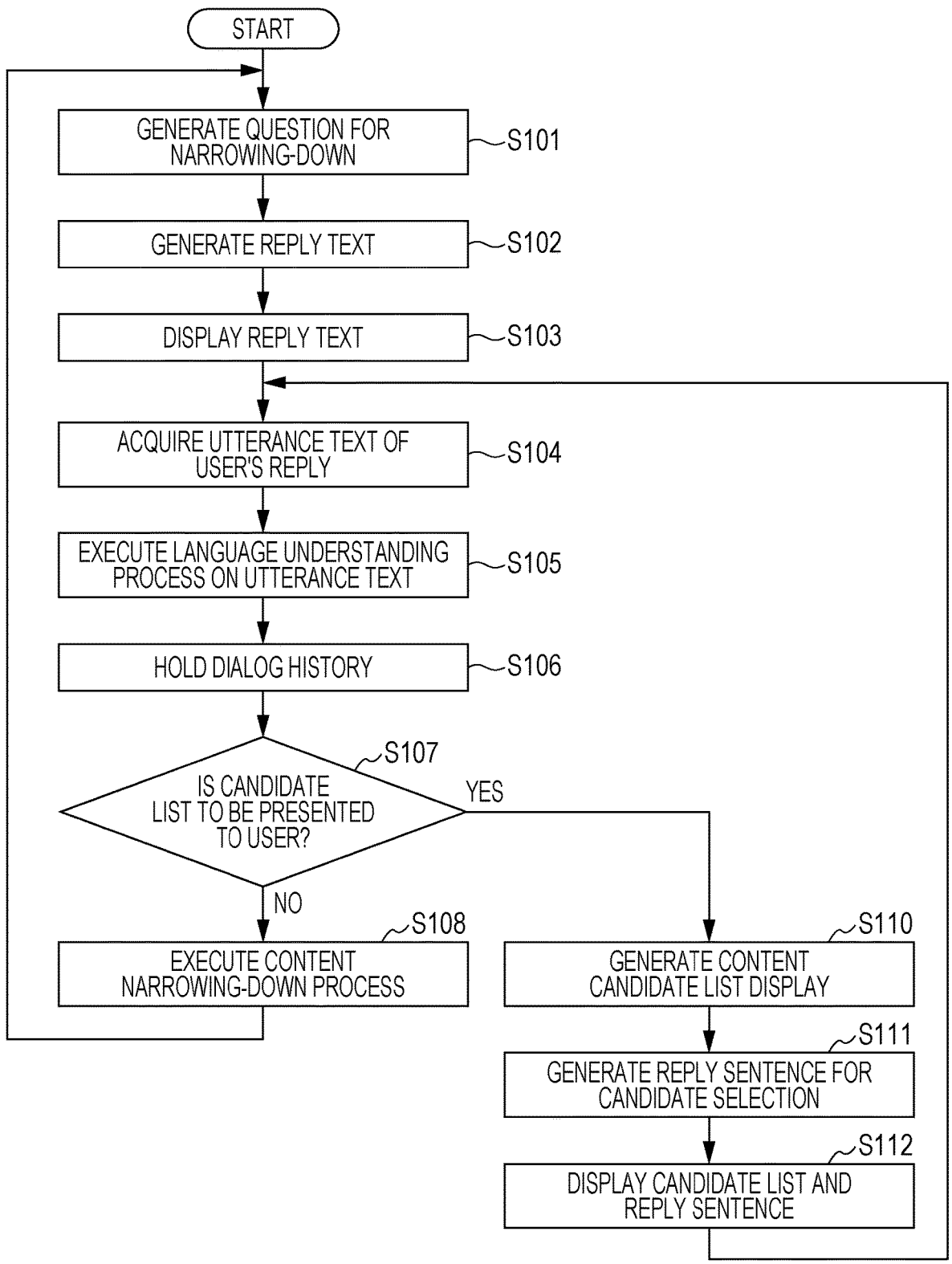
FIG. 7 is a flowchart illustrating a flow of a process executed by the dialog system according to the embodiment.
Figure 8:
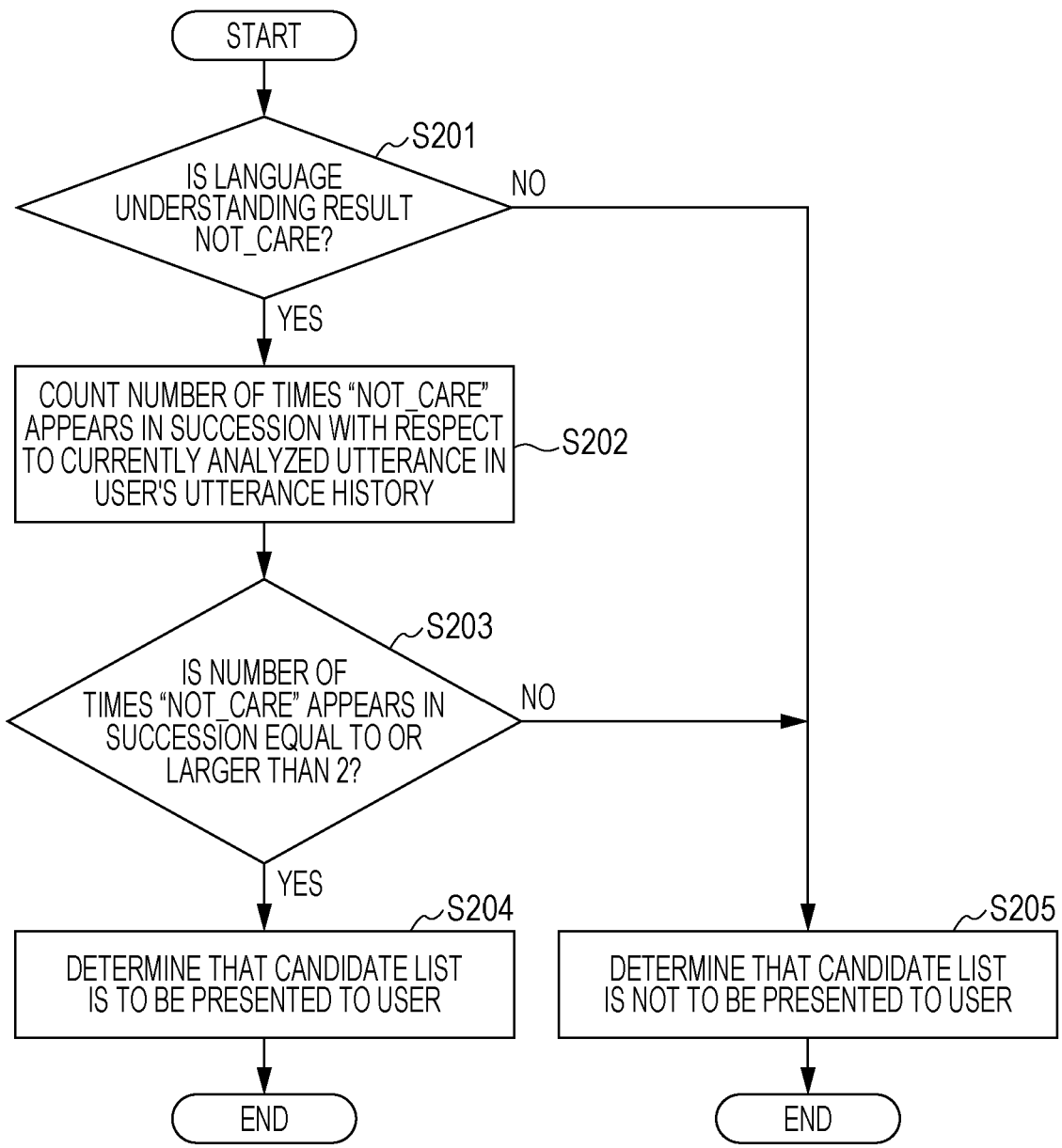
FIG. 8 is a flowchart illustrating a process executed by the dialog system according to the embodiment, the process being related to determination of whether to present a candidate list.

A flow of a process executed by the dialog system 1 of the embodiment will be described. FIG. 7 is a flowchart illustrating the flow of the process executed by the dialog system 1 according to the embodiment. FIG. 8 is a flowchart illustrating a process performed by the dialog system 1 according to the embodiment, the process being related to determination of whether to present a candidate list.

In step S101, the dialog manager 104 generates a question for narrowing-down and outputs the question as reply content. Among narrow-down keys assigned to the pieces of content in the content database 106, a narrow-down key that has not appeared yet in the narrowing-down information held in the narrowing-down information holder 107 is selected for the question for narrowing-down. The narrow-down key may be selected at random, by a method using a decision tree algorithm to determine the preference of narrow-down key searching, or in accordance with a predetermined order.

In step S102, the reply generator 105 converts the reply content selected in step S101 (that is, the question) to a reply text.

In step S103, the display unit 102 displays the reply text (that is, the question sentence) generated by the reply generator 105 in step S102.

Figure 9:
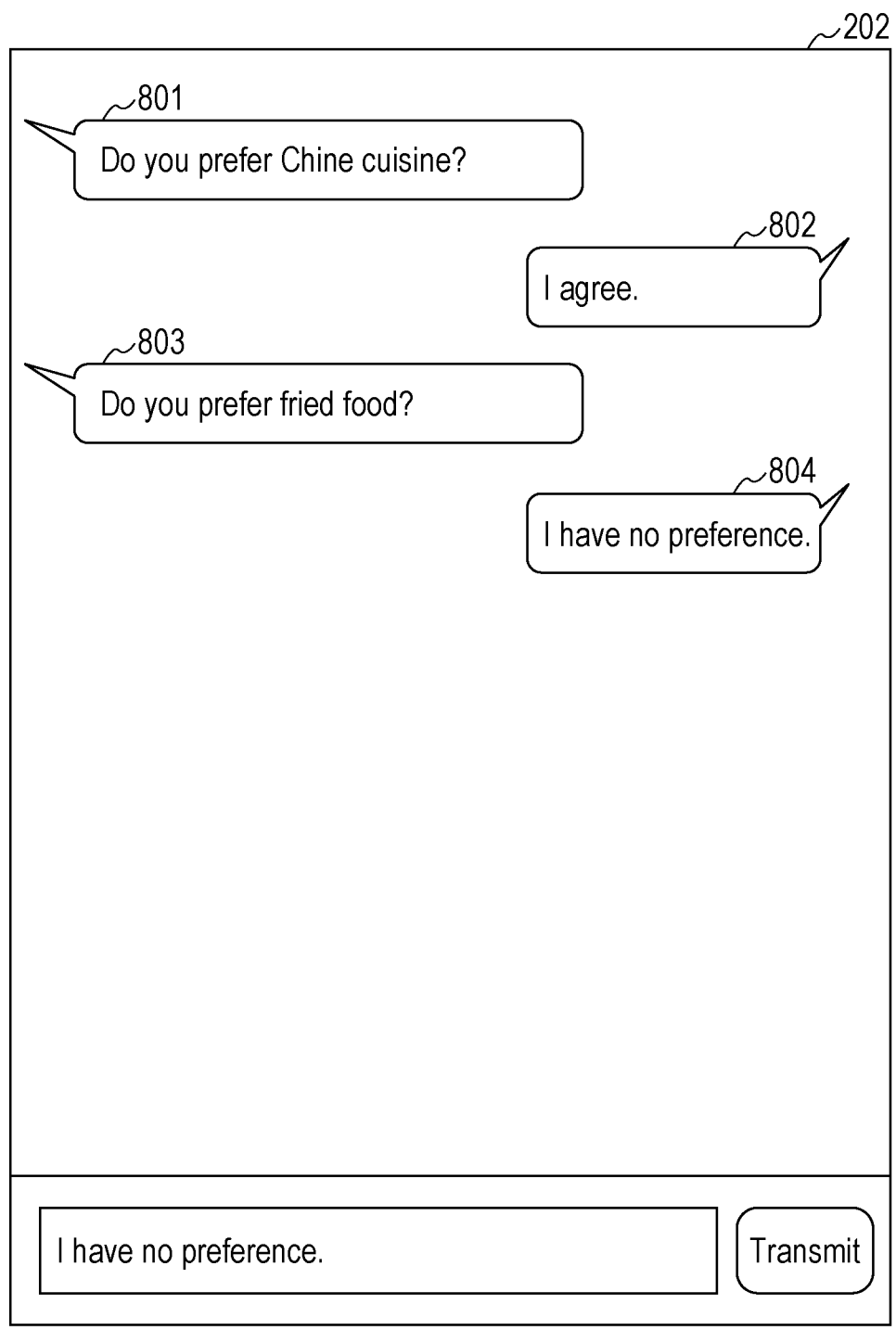
FIG. 9 is a first explanatory diagram illustrating an example operation performed by the dialog system according to the embodiment.

For example, if the reply content is "Q, genre (Chinese cuisine)", a reply text such as "Do you prefer Chinese cuisine?" is displayed in a text form like a reply text 801 in FIG. 9.

In step S104, the inputter 101 acquires an utterance text indicating the user's utterance.

In step S105, the language understander 103 executes a language understanding process on the utterance text acquired in step S104 and converts the user's utterance text to semantic information.

In step S106, the dialog manager 104 adds the semantic information converted in step S105 to the dialog history holder 109. In other words, the dialog manager 104 holds the history of dialogs including the question to the user and the user's reply to the question.

In step S107, the user's intention estimator 110 estimates the user's intention based on the dialog history. Based on the result of the intention estimation performed by the user's intention estimator 110 based on the dialog history, the dialog manager 104 determines whether to execute a process for generating content candidate list display. In other words, the dialog manager 104 and the user's intention estimator 110 determine whether the manner in which the third reply appears in the reply history included in the held dialog history satisfies the predetermined condition. The details of the determination in step S107 will be described later.

If the dialog manager 104 determines in step S107 that the process for generating content candidate list display is to be executed (YES in step S107), the process proceeds to step S110. If the dialog manager 104 does not determine that the process for generating content candidate list display is to be executed (NO in step S107), the process proceeds to step S108.

In step S108, the dialog manager 104 extracts a narrow-down key from the preceding reply content and a narrowing-down condition from semantic information regarding the user's utterance. The dialog manager 104 combines the narrow-down key and the narrowing-down condition and adds the combination as the narrowing-down information to the narrowing-down information holder 107. The dialog manager 104 also instructs the narrowing-down processor 108 to execute the narrowing-down process, and the narrowing-down processor 108 executes the process for narrowing down the pieces of content. Thereafter, the process returns to step S101.

In step S110, the dialog manager 104 instructs the candidate-list display generator 111 to generate candidate list display. The candidate-list display generator 111 generates text information regarding a list of narrowed-down content candidates based on pieces of content held in the narrowing-down processor 108 as the result of the preceding narrowing-down process.

In step S111, the dialog manager 104 generates reply content inquiring which one of the content candidates is to be selected. The reply generator 105 then converts the reply content generated by the dialog manager 104 to a reply text. The dialog manager 104 receives the candidate-list text generated by the candidate-list display generator 111 in step S108.

In step S112, the dialog manager 104 displays the reply text and the candidate-list text on the display unit 102. In other words, if the user's intention estimator 110 determines that the predetermined condition is satisfied, the display unit 102 performs presentation regarding the information stored in the content database 106.

The details of a process included in step S107 will be described with reference to FIG. 8.

In step S201, the user's intention estimator 110 determines whether the semantic information regarding the user's utterance that is acquired as the result of the language understanding by the language understander 103 is "NOT_CARE". If the user's intention estimator 110 determines that the semantic information regarding the user's utterance is "NOT_CARE" (YES in step S201), the process proceeds to step S202. If the user's intention estimator 110 does not determine that the semantic information regarding the user's utterance is "NOT_CARE", the process proceeds to step S205.

In step S202, the user's intention estimator 110 counts the number of times "NOT_CARE" appears in succession with respect to the currently analyzed utterance in the user's utterance history in the dialog history.

In step S203, the user's intention estimator 110 determines whether the number of times "NOT_CARE" appears in succession in the user's utterance history in the dialog history is equal to or larger than 2. If the number of times "NOT_CARE" appears in succession is equal to or larger than 2 (YES in step S203), the process proceeds to step S204. If the number of times is smaller than 2 (NO in step S203), the process proceeds to step S205.

In step S204, the user's intention estimator 110 estimates that the user intends to perform a "candidate list request". The dialog manager 104 determines that the candidate list is to be presented to the user.

In step S205, the user's intention estimator 110 estimates that the user intends to perform a "narrowing-down request". The dialog manager 104 determines that the candidate list is not to be presented to the user.

After steps S204 and S205, a series of steps illustrated in FIG. 8 is terminated, and the process proceeds to step S108 (FIG. 7).

Figure 10:
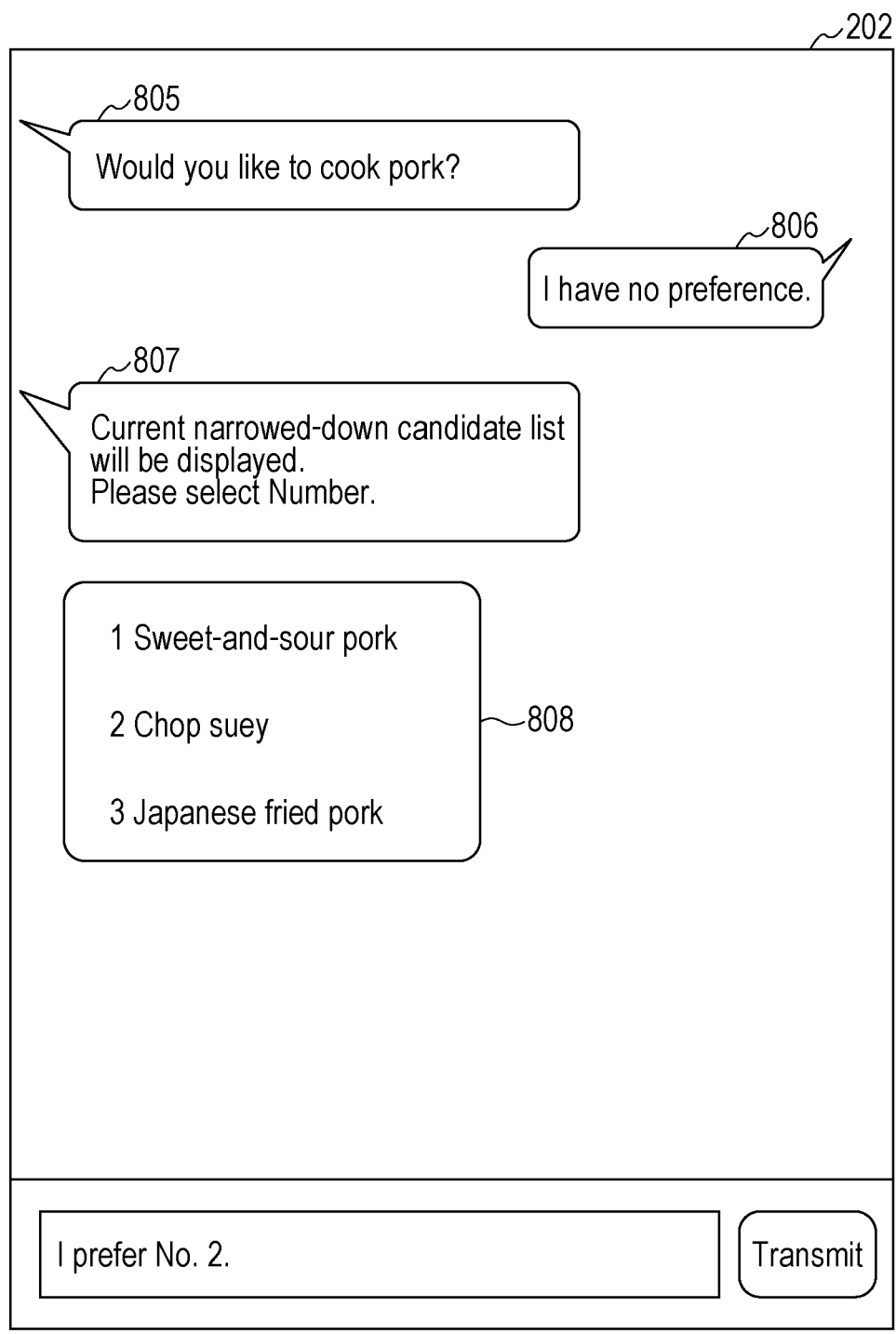
FIG. 10 is a second explanatory diagram illustrating an example operation performed by the dialog system according to the embodiment.

An example operation performed by the dialog system 1 will be described. FIGS. 9 and 10 are each an explanatory diagram illustrating an example operation performed by the dialog system 1 according to the embodiment.

First, the dialog system 1 inquires of the user whether the genre of a dish to be searched for is the Chinese cuisine by using the reply text 801. In response to the inquiry, the user makes an affirmative reply by using an utterance text 802. Based on the affirmative reply from the user, the narrowing-down processor 108 refers to the content table and narrows down the pieces of content by extracting only pieces of content matching the genre of the Chinese cuisine.

Subsequently, the dialog system 1 inquires of the user about a recipe and an ingredient by using reply texts 803 and 805. In response to the inquiries, the user gives respective utterances having semantic information indicating "NOT_CARE" by using utterance texts 804 and 806.

At this time, the utterance texts 804 and 806 correspond to the utterances having the semantic information indicating "NOT_CARE" and appearing twice in succession in the reply history. The dialog manager 104 thus determines that the candidate list is to be presented to the user as the result of the intention estimation performed by the user's intention estimator 110 (step S204). A reply text 807 and a candidate-list text 808 are then presented (step S111 and S112).

The dish narrowing-down and the candidate list display using the dialog system 1 are achieved in this manner.

In the process flow described above, based on the history of dialogs between the dialog system 1 and the user, the dialog system 1 appropriately estimates the user's intention such as whether the user intends to continue narrowing down pieces of content or to browse a candidate list of the narrowed-down pieces of content. The timing of presenting a list of pieces of content to the user can thereby be appropriately determined from the state of the dialogs without in advance acquiring information indicating whether the user intends to browse the candidate list at an early stage.

An example of applying the dialog system 1 to searching for another type of content that is an author will be described.

In this case, the content database 106 stores therein a plurality of pieces of information respectively indicating authors. The dialog system 1 provides information indicating an author desired by the user by using dialogs including a question to the user about a search for the author and a reply from the user to the question.

FIG. 11 is an explanatory table illustrating a content table of the dialog system 1 according to the embodiment in a different application example.

In the content table illustrated in FIG. 11 the content names have author names. The narrow-down keys include genres and categories of works of the authors.

Figure 12:
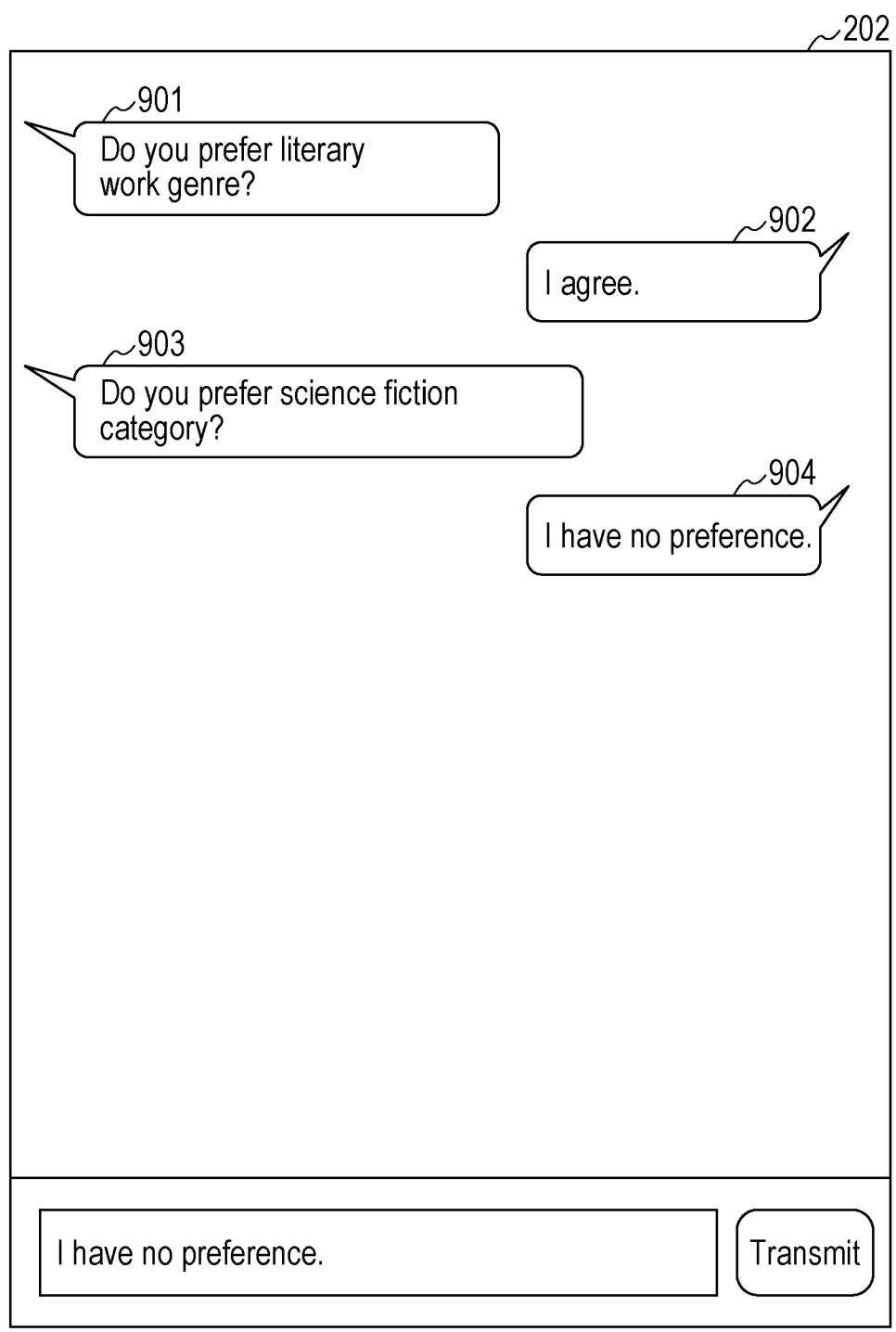
FIG. 12 is a first explanatory diagram illustrating an example operation performed by the dialog system according to the embodiment in the different application example.
Figure 13:
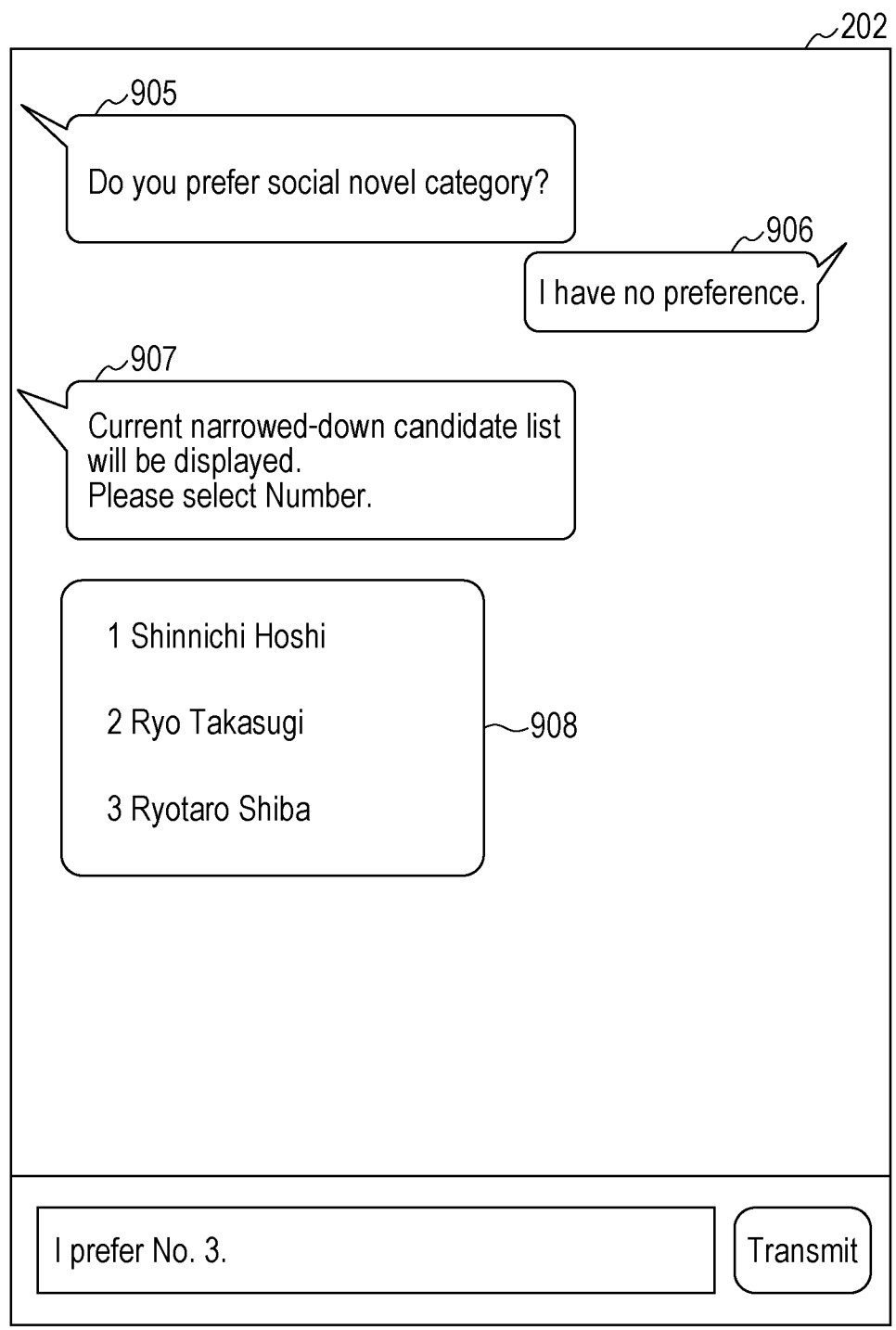
FIG. 13 is a second explanatory diagram illustrating the example operation performed by the dialog system according to the embodiment in the different application example.

FIGS. 12 and 13 are explanatory diagrams illustrating an example operation performed by the dialog system 1 according to the embodiment in the different application example.

First, the dialog system 1 inquires of the user whether a genre for an author to be searched for is a literary work by using a reply text 901. In response to the inquiry, the user makes an affirmative reply by using an utterance text 902. Based on the affirmative reply from the user, the narrowing-down processor 108 refers to the content table, narrows down pieces of content by extracting only pieces of content in the literary work genre.

Subsequently, the dialog system 1 inquires of the user about a category by using reply texts 903 and 905. In response to the inquiries, the user gives respective utterances having semantic information indicating "NOT_CARE" by using utterance texts 904 and 906.

At this time, the utterance texts 904 and 906 correspond to the utterances having the semantic information indicating "NOT_CARE" and appearing twice in succession in the reply history. The dialog manager 104 thus determines that the candidate list is to be presented to the user as the result of the intention estimation performed by the user's intention estimator 110 (step S204). A reply text 907 and a candidate-list text 908 are then presented (step S111 and S112).

The author narrowing-down and the candidate list display using the dialog system 1 are achieved in this manner.

Note that the dialog processing method performed by the dialog system 1 may be expressed as follows.

The dialog processing method performed by the dialog system 1 is an information processing method for a dish favored by a user that is performed using dialogs in a chat form via a terminal of the user. In the information processing method, a first question about a request for the dish is displayed based on a database in a balloon form on a display included in the terminal. The database includes a plurality of dishes and a plurality of pieces of classification information each indicating a corresponding one of classifications of the respective plurality of dishes. Each dish is associated with a corresponding one of the pieces of classification information. Each piece of classification information includes warmness or coldness of a corresponding one of the dishes, a genre of the corresponding dish, a category of the corresponding dish, a recipe of the corresponding dish, and an ingredient used for the corresponding dish. The first question inquires whether to request a first classification for the dish. The first classification is included in the database. A first answer input via the terminal by the user in response to the first question is received. If the first answer is determined to include a word that affirms the first classification, a second question as to whether a second classification matching first dishes falling in the first classification is to be requested is displayed based on the database in the balloon form on the display. The second classification is different from the first classification. A second answer input via the terminal by the user in response to the second question is received. If the second answer is determined to include neither a word that affirms the second classification nor a word that refuses the second classification, a third question as to whether a third classification matching the first dishes is to be requested is displayed based on the database in the balloon form on the display. The third classification is different from the first classification and the second classification. A third answer input via the terminal by the user in response to the third question is received. If the third answer is determined to include a word that affirms the third classification, a fourth question as to whether a fourth classification matching a second dish falling in the third classification among the first dishes is to be requested is displayed in the balloon form. The fourth classification is different from the first classification, the second classification, and the third classification. If the third answer is determined to include a word that refuses the third classification, a fifth question as to whether a fifth classification matching a third dish not falling in the third classification among the first dishes is to be requested is displayed in the balloon form. The fifth classification is different from the first classification, the second classification, the third classification, and the fourth classification. If the third answer is determined to include neither the word that affirms the third classification nor the word that refuses the third classification, a fifth question as to whether a piece of information indicating one of the first dishes is to be displayed is displayed in the balloon form on the display. A fifth answer input via the terminal by the user in response to the fifth question is received. If the fifth answer is determined to include a word that affirms displaying of the piece of information indicating the first dish, the piece of information indicating the first dish is displayed on the display.

The author narrowing-down and the candidate list display using the dialog system 1 are achieved in the same manner as described above.

Modification of Embodiment

The configuration of a dialog system implemented by a plurality of apparatuses connected to be able to communicate with each other via a network in a modification will be described.

Figure 14:
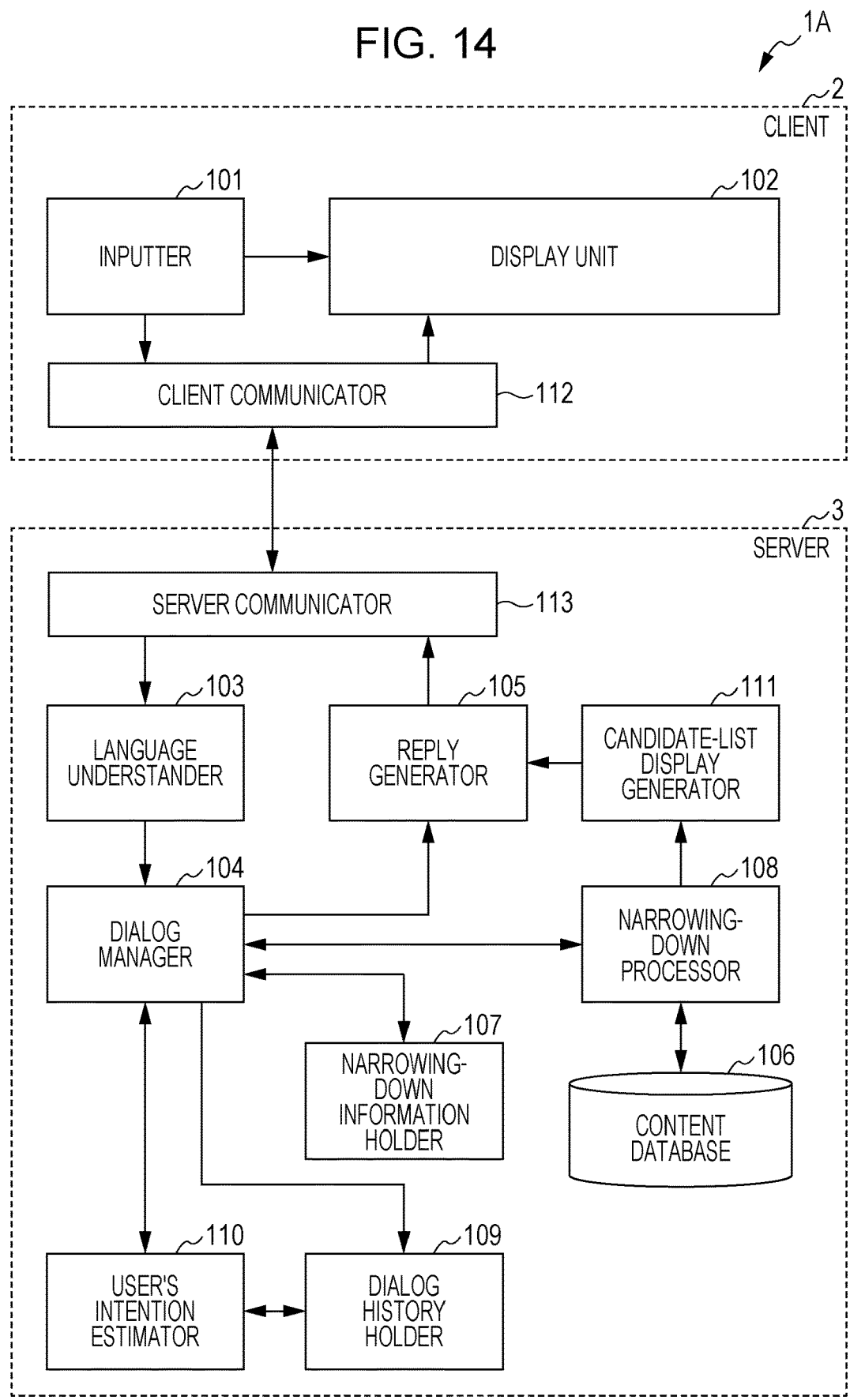
FIG. 14 is a block diagram illustrating the configuration of a dialog system according to a modification of the embodiment.

FIG. 14 is a block diagram illustrating the configuration of a dialog system 1A according to the modification. Note that the same components in the embodiment described above are denoted by the same reference numerals, and detailed description thereof is omitted.

The dialog system 1A includes a client 2 and a server 3.

The client 2 includes the inputter 101, the display unit 102, and a client communicator 112.

The server 3 includes the language understander 103, the dialog manager 104, the reply generator 105, the content database 106, the narrowing-down information holder 107, the narrowing-down processor 108, the dialog history holder 109, the user's intention estimator 110, the candidate-list display generator 111, and a server communicator 113.

The client communicator 112 and the server communicator 113 are connected to be able to communicate with each other via a network (not illustrated). Communication between the inputter 101 and the language understander 103, communication between the reply generator 105 and the display unit 102, and the like are implemented through communication between the client communicator 112 and the server communicator 113 via the network.

The configuration enables the candidate-list presentation timing to be appropriately controlled as in the embodiment described above.

In the configuration in the modification, a plurality of clients 2 may be connected to the one server 3. With the configuration as described, for example, terminals of respective users may serve as the clients 2, and the server 3 can be implemented by a server (so-called cloud server) accessible from each terminal via the network. This facilitates repairs and maintenances of the components such as the language understander 103 and the dialog manager 104 of the server 3 and leads to processing load reduction, cost reduction, and the like.

As described above, according to the information processing method of the embodiment, the information processing method controls timing of presenting a candidate list in accordance with the content of user's utterances in the dialogs with the user. The third reply that is neither an affirmative reply nor a negative reply is also considered to be an expression of the user's intention not to provide an explicit narrowing-down condition. Accordingly, the manner in which the third reply appears may be a criterion for estimating whether the user would like to browse the content candidate list at that time. Even though the information indicating whether the user's intention to browse the list of narrowed-down content candidates early is not acquired in advance, the timing of presenting the list of narrowed-down content candidates can thereby be controlled in such a manner that the user's intention is estimated in accordance with the content of the user's utterances.

With the information processing method, the use of the condition in which the third reply appears in succession the predetermined number of times enables the information processing method to be implemented more specifically. The candidate-list presentation timing can be controlled more appropriately.

With the information processing method, the use of the condition in which the third reply appears the predetermined total number of times enables the information processing method to be implemented more specifically. The candidate-list presentation timing can be controlled more appropriately.

Based on the intention estimation, the information processing method can cause the user to browse the list of narrowed-down content candidates. The user's intention is estimated based on the content of the user's utterances as described above, and the timing of presenting the list of narrowed-down content candidates can thereby be controlled.

Based on the intention estimation, the information processing method can present a question as to whether the list of narrowed-down content candidates is to be browsed by the user. The timing control based on the intention estimation causes the content candidate list to be presented at a timing different from a timing actually intended by the user in some cases. To address this, the question is used to confirm the user's actual intention, and the content candidate list can thus be prevented from being presented against the user's intention.

With the information processing method, the content candidate list can be presented to the user and cause the user to browse the content candidate list after correspondence between the timing of presenting the content candidate list and the timing intended by the user is confirmed.

With the information processing method, pieces of information stored in the storage can be narrowed down by using the dialog interface, and the narrowed-down pieces of information can be presented to the user. Unlike information search with a search engine or the like, the user can perform information search based on sequential information input using dialogs and receive suggestion from the dialog system.

If there is no narrowing-down condition, the information processing method can avoid displaying a list of all of the pieces of information stored in the storage, that is, the pieces of information having not narrowed down.

With the information processing method, searches and proposals can be performed more specifically based on dialogs including a closed question that provides options to select one of the options as an answer and the answer to the question.

With the information processing method, a search or a proposal for a dish can be provided to the user by narrowing down pieces of information indicating respective dishes.

With the information processing method, a search or a proposal for an author can be provided to the user by narrowing down pieces of information indicating respective authors.

Note that part or the entirety of the embodiment described above may be expressed as below but is not limited to the following description.

(1) A method for controlling narrowed-down result presentation is performed in a dialog system that acquires information for narrowing down a plurality of pieces of content to be searched for or provided by using dialogs and that provides a piece of content satisfying a desire of a user. The method includes estimating whether the user intends to continue narrowing down the pieces of content or to browse a candidate list of narrowed-down pieces of content, the estimating being performed based on a history of the dialogs through which the user provides an answer indicating an intention of the user in response to a question to the user from the dialog system; and controlling whether the candidate list of the narrowed-down pieces of content is to be presented at that time, the controlling being performed based on a result of the estimating of the intention of the user.

(2) In the method for controlling narrowed-down result presentation according to (1) above, if a sequence of answers from the user to the dialog system satisfies a predetermined condition in the history of the dialogs held in the dialog system, the intention of the user is estimated to be a request for browsing the candidate list.

(3) In the method for controlling narrowed-down result presentation according to (1) above, whether the intention of the user is a request for browsing a candidate list is estimated by using a user's intention estimation method based on machine learning that uses, as learning data, dialog history data including the history of the dialogs between the dialog system and the user or a history of dialogs between humans, the histories being provided with information indicating whether the intention of the user is a request for browsing the candidate list.

With the configuration described above, even though the information indicating whether the user intends to browse the candidate list of the narrowed-down pieces of content early is not acquired in advance, the timing of presenting the candidate list of the narrowed-down pieces of content can be controlled in such a manner that whether the user intends to narrow down the content by answering a question from the system is estimated based on the state of the answer from the user to the question.

Note that the components may be configured of dedicated hardware or may be implemented by running software programs suitable for the respective components in the embodiment. The components may be implemented in such a manner that a program running unit such as a central processing unit (CPU) or a processor reads and runs a software program recorded in a recording medium such as a hard disk or a semiconductor memory. Note that the software implementing the information processing apparatus in the embodiment is a program as described below.

The program causes a computer to execute an information processing method for pieces of information stored in a storage. The method includes: holding a dialog history of a dialog including a question to a user and a reply from the user to the question; determining whether a manner in which at least one third reply indicating neither a first reply nor a second reply appears in a reply history of the reply included in the held dialog history satisfies a predetermined condition, the first reply indicating an affirmative in response to the question, the second reply indicating a negative in response to the question; and performing presentation regarding the pieces of information stored in the storage if the manner is determined to satisfy the predetermined condition.

The information processing apparatus and the like according to the one or more aspects of the present disclosure have heretofore been described based on the embodiment. However, the present disclosure is not limited to this embodiment. Various modifications conceived by those skilled in the art that are made to the embodiment and combinations of components in different embodiments may be included in the one or more aspects without departing from the spirit of the present disclosure.

The information processing methods according to the present disclosure are usable for an information processing method and the like for controlling candidate-list presentation timing more appropriately.

What is claimed is:

1. An information processing method for pieces of information stored in a storage, the method comprising:
    holding, in a memory, a dialog history of a dialog including at least one question to a user and at least one reply from the user to the at least one question, the at least one reply from the user including a first reply indicating an affirmative in response to the at least one question, a second reply indicating a negative response to the at least one question, or a third reply indicating neither the first reply nor the second reply;
    determining, by a processor, a number of instances in which the appears in a reply history of the at least one reply included in the held dialog history;
    determining, by the processor, whether the number of instances of the third reply is greater than or equal to a predetermined number;
    determining, by the processor, that a predetermined condition is met when the number of instances of the third reply is greater than or equal to the predetermined number;
    performing, on a display, presentation regarding the pieces of information stored in the storage when the predetermined condition is determined to be satisfied;
    generating, based on the presentation, a request for selecting a candidate among a plurality of candidates included in the presentation;
    displaying, on the display, the request for selecting;
    receiving a selection among the plurality of candidates displayed on the display; and
    generating at least one narrowing-down question based on the received selection, the at least one narrowing-down question reducing a number of candidates of consideration for the user,
    wherein the at least one question in the dialog history includes a number of questions less than a number of available questions to be asked when the predetermined condition is determined to be satisfied.

2. The information processing method according to claim 1,
    wherein the predetermined condition further includes a condition in which the third reply appears in succession a predetermined number of times in the reply history.

3. The information processing method according to claim 1,
wherein the predetermined condition is a condition in which the third reply appears a predetermined total number of times in the reply history.

4. The information processing method according to claim 1,
wherein in the presentation, at least one of the pieces of information stored in the storage is presented.

5. The information processing method according to claim 1,
wherein in the presentation, a question as to whether at least one of the pieces of information stored in the storage is to be presented is presented.

6. The information processing method according to claim 5,
wherein in the presentation, if an affirmative reply from the user is acquired in response to the question, the at least one of the pieces of information stored in the storage is presented.

7. The information processing method according to claim 1, further comprising:
executing a process for narrowing down the pieces of information stored in the storage by using the at least one reply included in the dialog; and
performing the presentation regarding the pieces of information stored in the storage after the process is executed.

8. The information processing method according to claim 1, further comprising:
executing a process for narrowing down the pieces of information stored in the storage by using predetermined information if the reply history is determined to include only the third reply; and
performing the presentation regarding the pieces of information stored in the storage after the process is executed.

9. The information processing method according to claim 1,
wherein the at least one question includes a closed question for causing the user to make one of the first reply, the second reply, and the third reply.

10. The information processing method according to claim 1,
wherein the storage stores, as the pieces of information, a plurality of pieces of information indicating respective dishes, and
wherein the dialog includes the at least one question to the user about searching of the dishes and the at least one reply from the user in response to the at least one question.

11. The information processing method according to claim 1,
wherein the storage stores, as the pieces of information, a plurality of pieces of information indicating respective authors, and
wherein the dialog includes the at least one question to the user about searching of the authors and the at least one reply from the user in response to the at least one question.

12. The information processing method according to claim 1, further comprising:
determining not to perform, on the display, the presentation regarding the pieces of information stored in the storage when the predetermined condition is determined not to be satisfied.

13. An information processing apparatus for performing information processing on information stored in a storage, the information processing apparatus comprising:
a memory that holds a dialog history of a dialog including at least one question to a user and at least one reply from the user to the at least one question, the at least one reply from the user including a first reply indicating an affirmative in response to the at least one question, a second reply indicating a negative response to the at least one question, or a third reply indicating neither the first reply nor the second reply;
a processor that
determines a number of instances in which the third reply appears in a reply history of the at least one reply included in the held dialog history, and
determines whether the number of instances of the third reply is greater than or equal to a predetermined number to satisfy a predetermined condition;
determines that a predetermined condition is met when the number of instances of the third reply is greater than or equal to the predetermined number;
a display that performs presentation regarding the information stored in the storage when the predetermined condition is determined to be satisfied;
wherein the processor further
generates, based on the presentation, a request for selecting a candidate among a plurality of candidates included in the presentation;
causes to display, on the display, the request for selecting;
receives a selection among the plurality of candidates displayed on the display; and
generates at least one narrowing-down question based on the received selection, the at least one narrowing-down question reducing a number of candidates of consideration for the user,
wherein the at least one question in the dialog history includes a number of questions less than a number of available questions to be asked when the predetermined condition is determined to be satisfied.

14. A non-transitory recording medium storing a program for causing a computer to execute the information processing method according to claim 1.

* * * * *